US008378037B2

(12) United States Patent  
Griswold

(10) Patent No.: US 8,378,037 B2
(45) Date of Patent: Feb. 19, 2013

(54) MOISTURE-CURABLE SILYLATED POLYUREA AND ADHESIVE, SEALANT AND COATING COMPOSITIONS CONTAINING SAME

(75) Inventor: Roy Melvin Griswold, Ballston Spa, NY (US)

(73) Assignee: Momentive Performance Materials Inc., Albany, NY (US)

( * ) Notice: Subject to any disclaimer, the term of this patent is extended or adjusted under 35 U.S.C. 154(b) by 233 days.

(21) Appl. No.: 12/005,233

(22) Filed: Dec. 26, 2007

(65) Prior Publication Data

US 2009/0171040 A1 Jul. 2, 2009

(51) Int. Cl.
*C08G 18/28* (2006.01)

(52) U.S. Cl. .......................................... 525/452; 528/28

(58) Field of Classification Search ................... 525/452
See application file for complete search history.

(56) References Cited

U.S. PATENT DOCUMENTS

| | | | |
|---|---|---|---|
| 3,892,696 A * | 7/1975 | Wood | 524/589 |
| 3,903,052 A * | 9/1975 | Wagner et al. | 528/21 |
| 3,940,370 A | 2/1976 | Disalvo | |
| 3,941,733 A | 3/1976 | Chang | |
| 4,645,816 A | 2/1987 | Pohl et al. | |
| 5,194,503 A * | 3/1993 | Bajc et al. | 525/123 |
| 5,354,829 A | 10/1994 | Swisher et al. | |
| 5,744,528 A * | 4/1998 | Callinan et al. | 524/265 |
| 6,117,552 A * | 9/2000 | Hanada et al. | 428/32.34 |
| 6,218,016 B1 | 4/2001 | Tedeschi et al. | |
| 6,281,322 B1 | 8/2001 | Groth et al. | |
| 6,520,186 B2 * | 2/2003 | Rollat et al. | 132/203 |
| 7,001,948 B2 | 2/2006 | Gupta et al. | |
| 7,057,001 B2 | 6/2006 | Bachon et al. | |
| 7,094,859 B2 | 8/2006 | Schindler et al. | |
| 7,211,621 B2 | 5/2007 | Flosbach et al. | |
| 7,781,525 B2 * | 8/2010 | Yano et al. | 525/102 |
| 2006/0205859 A1 * | 9/2006 | Bachon et al. | 524/500 |
| 2007/0129527 A1 | 6/2007 | Griswold | |

FOREIGN PATENT DOCUMENTS

DE 4111654 A1 10/1992

* cited by examiner

*Primary Examiner* — Randy Gulakowski
*Assistant Examiner* — Mike M Dollinger
(74) *Attorney, Agent, or Firm* — Dominick G. Vicari; Joseph S. Ostroff

(57) ABSTRACT

A moisture-curable, optionally cured, silylated polyurea possessing an average of from 80 to 100 equivalent percent of urea linkages based on the total equivalents of urea and urethane linkages therein is the reaction product of organofunctional silane (a) possessing hydrolyzable functionality and at least one polyurea (b) possessing amine termination or isocyanate termination, polyurea (b) being obtained from the reaction of at least one polyamine (c) and at least one polyisocyanate (d) in the substantial absence of silane (a).

17 Claims, No Drawings

MOISTURE-CURABLE SILYLATED POLYUREA AND ADHESIVE, SEALANT AND COATING COMPOSITIONS CONTAINING SAME

BACKGROUND OF THE INVENTION

This invention relates to moisture-curable silylated resins and to adhesive, sealant and coating compositions containing same.

Isocyanate-terminated polyurea compositions offer rapid cure, high thermal stability, excellent adhesion properties and good resistance to abrasion, and mild bases/acids making them ideal for many coating applications. These polyureas are extensively used as protective coatings on vertical and horizontal surfaces such as roofs, storage tanks, walkways, parking decks, joint seals and waterproof linings. Disadvantages of these polyureas include the handling of polyisocyanates, aerosol dispersal of materials containing unreacted polyisocyanates and the requirement that these products be formulated as two-component compositions with consequently limited pot life once the components are mixed together.

SUMMARY OF THE INVENTION

In accordance with the present invention, there is provided a moisture-curable, optionally cured, silylated polyurea or mixture thereof which comprises the reaction product of at least one organofunctional silane (a) possessing hydrolyzable functionality and at least one amine-terminated or isocyanate-terminated polyurea (b) such that when polyurea (b) is amine-terminated polyurea (b)(1), organofunctional silane (a) is amine-reactive silane (a)(1), and when polyurea (b) is isocyanate-terminated polyurea (b)(2), organofunctional silane (a) is isocyanate-reactive silane (a)(2), polyurea (b) being obtained from the reaction of at least one polyamine (c) and at least one polyisocyanate (d) in the substantial absence of organofunctional silane (a), the moisture-curable silylated polyurea possessing an average of from 80 to 100 equivalent percent of urea linkages based on the total equivalents of urea and urethane linkages therein.

The expression amine-terminated or isocyanate-terminated "polyurea (b)" shall be understood herein to mean a compound possessing at least two urea linkages, i.e., at least two

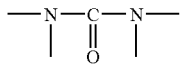

linkages.

The expression "the substantial absence of organofunctional silane (a)" as it applies to the reaction of polyamine(s) (c) and polyisocyanate(s)(d) to produce intermediate polyurea(s)(b) shall be understood to mean that there shall be no addition of organofunctional silane(s)(a) to polyurea(s)(b) until in a given polyurea-forming reaction medium substantially the maximum theoretical amount of polyurea(s)(b), e.g., at least 80, and preferably at least 90, weight percent, of this amount has been obtained.

The silylated polyurea of this invention exhibits levels of thermal stability which typically are greater than those of silylated resins possessing significant numbers of urethane linkages, e.g., silylated polyurethane-polyurea resins such as those disclosed in U.S. Pat. Nos. 3,941,733 and 7,211,621 and published U.S. patent application 2007/0129527, and silylated polyurethane resins such as those disclosed in U.S. Pat. Nos. 4,345,053, 4,625,012, 4,645,816, 5,012,044, 5,852,137, 5,703,159, 5,900,458, 5,990,458, 6,001,214, 6,310,170 and 6,833,423, among others. The more thermally stable silylated resin of this invention is therefore better suited for incorporation in compositions where relatively high temperatures may be encountered, either during the application of the compositions and/or once cured, during their service life.

In addition to its high level of thermal stability, the silylated polyurea of this invention tends to exhibit excellent solvent resistance while avoiding the disadvantages associated with the handling and use of the two-component polyurea-forming products referred to above. Furthermore, due to the higher reactivity of amine groups with polyisocyanates (involved in the preparation of intermediate polyurea (b) in the present invention) compared to that of hydroxyl groups with polyisocyanates (involved in the preparation of intermediate polyurethane prepolymer in the prior art), there is the additional advantage that the silylated polyurea of this invention can be prepared in less time than that of silylated polyurethanes ("SPURs") thereby reducing the cost of production in the case of the silylated resin of this invention.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

DETAILED DESCRIPTION OF THE INVENTION

In accordance with the present invention, moisture-curable, optionally cured, silylated polyurea or mixture thereof possessing an average of from 80 to 100, preferably at least 90 and more preferably at least 95, equivalent percent of urea linkages based on the total equivalents of urea and urethane linkages therein is obtained by reacting at least one organofunctional silane (a) possessing hydrolyzable functionality with at least one polyurea (b) possessing amine termination or isocyanate termination under silylation reaction conditions, polyurea (b) being obtained from the reaction of at least one polyamine (c) and at least one polyisocyanate (d) in the substantial absence of organofunctional silane (a) such that when polyurea (b) is amine-terminated polyurea (b)(1), organofunctional silane (a) is amine-reactive silane (a)(1) and when polyurea (b) is isocyanate-terminated polyurea (b)(2), organofunctional silane (a) is isocyanate-reactive silane (a)(2), polyurea (b) being unaccompanied by polyurea which is neither amine-terminated nor isocyanate-terminated.

In order to achieve the aforestated minimum average of 80 equivalent percent of urea linkages in the moisture-curable silylated polyurea of the invention, silane (a), polyamine (c), polyisocyanate (d) and any other reactants that may be employed in the production of polyurea (b), e.g., chain extenders, polymeric polyols, etc., should contain no, or at most relatively few, urethane linkages and no, or at most relatively few, hydroxyl groups that could react with isocyanate groups to form urethane linkage(s). Thus, e.g., amine-terminated polyethers (polyetheramines) obtained from the reductive amination of polyether polyols with ammonia or primary amines and containing some small percentage of unconverted hydroxyl groups, typically 2-5 percent or so in some commercially available materials, are useful for producing intermediate polyurea (b) herein provided the number of urethane groups in the polyurea does not result in an overall equivalent percent of urea linkages in the moisture-curable silylated polyurea of the invention which is below the aforestated minimum of 80 equivalent percent. Similarly, chain extenders such as 1,4-butanediol and polymeric polyols such as polyether diols may be used in producing polyurea(s)(b) provided the minimum equivalent percent of urea linkages in the moisture-curable silylated polyurea(s) of the invention is observed. Organofunctional silanes containing one or more urethane linkages can be used for silylating polyurea(s)(b), again, as long as the minimum equivalent percent of urea linkages in the resulting moisture-curable silylated polyurea(s) is met.

As those skilled in the art will recognize, the molecular weight and viscosities of the moisture-curable silylated polyureas in accordance with the invention will depend on such factors as the nature of organofunctional silane (a), e.g., the number and type of its organofunctional group(s), whether it is monomeric or polymeric and if the latter, its molecular weight, backbone structure, etc., the nature of polyamine (c) and polyisocyanate (d) used in the preparation of polyurea (b), e.g., the number and types of amine functionalities (primary and/or secondary) in polyamine (c), the number of isocyanate groups in polyisocyanates (d), the molecular weights of these reactants as well as their other structurally determined properties, the use of chain extenders, the stoichiometrics of a given polyurea-forming reaction, and similar considerations.

The number average molecular weight of the moisture-curable silylated polyurea of the invention can vary widely, e.g., from about 3,000 to 100,000, preferably from about 4,000 to 75,000 and more preferably from about 5,000 to 50,000. Their viscosities, too, can vary considerably, e.g., from about 5,000 to 5,000,000 cps., preferably from about 10,000 to 3,000,000 cps., and more preferably from about 20,000 to 3,000,000 cps., on a solids basis.

Any silane possessing both hydrolyzable functionality and amine-reactive functionality under the conditions of the silylating reaction can be employed as amine-reactive silane (a)(1) herein for silylating amine-terminated polyurea (b)(1) to provide moisture-curable silylated polyurea of the invention. Included among such silanes are those represented by the general formula:

$$Q-R^1-SiX_aY_{3-a}$$

wherein Q is an amine-reactive functionality, e.g., isocyanate, epoxy, or (meth)acryloxy functionality, $R^1$ is a divalent bridging group, e.g., an alkylene group of up to 12 carbon atoms optionally containing one or more heteroatoms, each X is independently hydrogen or hydrocarbyl of up to 12 carbon atoms, each Y is independently alkoxy of up to 20 carbon atoms, carboxyloxy containing up to 20 carbon atoms, phenoxy, halogen, amine, aminoxy, imidazole, acetonoxy, acetamide, benzamide or ketoxime and a is 0, 1 or 2. In one embodiment, $R^1$ is alkylene of from 1 to 4 carbon atoms, each X, if present, is alkyl of from 1 to 4 carbon atoms and each Y is alkoxy of from 1 to 4 carbon atoms.

Specific amine-reactive silanes (a)(1) that can be used in the preparation of the silylated polyureas of the invention include: isocyanatosilanes (a)(1)(i) such as methyldimethoxysilylmethyl isocyanate, trimethoxysilylmethyl isocyanate, diethylmethoxysilylmethyl isocyanate, ethyldimethoxysilylmethyl isocyanate, methyldiethoxysilylmethyl isocyanate, triethoxysilylmethyl isocyanate, ethyldiethoxysilylmethyl isocyanate, methyldimethoxysilylethyl isocyanate, trimethoxysilylethyl isocyanate, ethyldimethoxysilylethyl isocyanate, methyldiethoxysilylethyl isocyanate, trimethoxysilylethyl isocyanate, ethyldiethoxysilylethyl isocyanate, methyldimethoxysilylpropyl isocyanate, trimethoxysilylpropyl isocyanate, ethyldimethoxysilylpropyl isocyanate, methyldiethoxysilylpropyl isocyanate, triethoxysilylpropyl isocyanate, ethyldiethoxysilylpropyl isocyanate, methyldimethoxysilylpropyl isocyanate, methyldimethoxysilylbutyl isocyanate, trimethoxysilylbutyl isocyanate, ethyldimethoxysilylbutyl isocyanate, methyldiethoxysilylbutyl isocyanate, trimethoxysilylbutyl isocyanate, ethyldiethoxysilylbutyl isocyanate, methyldimethoxysilylpentyl isocyanate, trimethoxysilylpentyl isocyanate, ethyldimethoxysilylpentyl isocyanate, methyldiethoxysilylpentyl isocyanate, triethoxysilylpentyl isocyanate, ethyldiethoxysilylpentyl isocyanate, methyldimethoxysilylpentyl isocyanate, methyldimethoxysilylhexyl isocyanate, trimethoxysilylhexyl isocyanate, ethyldimethoxysilylhexyl isocyanate, methyldiethoxysilylhexyl isocyanate, triethoxysilylhexyl isocyanate, ethyldiethoxysilylhexyl isocyanate, methyldimethoxysilylhexyl isocyanate, λ-trimethoxysiloxydimethylsilylpropyl isocyanate, and the like; epoxysilanes (a)(1)(ii) such as 3-glycidoxypropyltrimethoxysilane, 3-glycidoxypropylmethyldiethoxysilane, β-(3,4-epoxycyclohexyl)ethyltrimethoxysilane, β-(3,4-epoxycyclohexyl)-ethyltriethoxysilane, and the like; and (meth)acryloxysilanes (a)(1)(iii) such as 3-acryloxypropyltrimethoxysilane, 3-acryloxypropyltriethoxysilane, 3-acryloxypropyltriisopropoxysilane, 3-methacryloxypropyltrimethoxysilane, 3-methacryloxyisobutyltrimethoxysilane, 3-acryloxypropyltrichlorosilane, 3-methacryloxyisobutyltrichlorosilane, 3-methacryloxyisobutyltrichorosilane, 3-methacryloxypropyl[tris(beta-methoxyethoxy)]silane, and the like.

Any silane possessing both hydrolyzable functionality and isocyanate-reactive functionality under the conditions of the silylating reaction can be employed as isocyanate-reactive silane (a)(2) for silylating isocyanate-terminated polyurea (b)(2) to provide moisture-curable silylated polyurea of the invention. Included among such silanes are those represented by the general formula:

$$HZ-R^1-SiX_aY_{3-a}$$

wherein $R^1$, X, Y and a have the aforestated meanings and Z is sulfur, —NH or —$NR^2$— in which $R^2$ is hydrocarbyl of up to 18 carbon atoms or —$R^1SiX_aY_{3-a}$ in which $R^1$, X, Y and a independently have one of the aforestated meanings, or —$NR^3$—C(=O)—$NR^4$— in which $R^3$ and $R^4$ each independently is hydrogen or hydrocarbyl of up to 18 carbon atoms.

Of these silanes, those in which Z is sulfur or —$NR^2$— in which $R^2$ is hydrocarbyl of up to 8 carbon atoms, each X is independently alkyl of from 1 to 4 carbon atoms and each Y is independently alkoxy of from 1 to 4 carbon atoms, are preferred.

Among the useful isocyanate-reactive silanes (a)(2), including several belonging to the aforesaid preferred group, are: mercaptosilanes (a)(2)(i) such as mercaptosilanes 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 3-mercaptopropyl trioctoxysilane, 2-mercaptoethyl tri-2'-ethylhexoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxys ilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxy phenylsilane, 3-mercaptocyclohexyl-trimethoxysilane, 12-mercaptododecyl trimethoxy silane, 12-mercaptododecyl triethoxy silane, 18-mercaptooctadecyl trimethoxysilane, 18-mercaptooctadecyl methoxydimethylsilane, 2-mercapto-2-methylethyl-tripropoxysilane, 2-mercapto-2-methylethyl-trioctoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyl trimethoxysilane, 1-mercaptomethyltolyl triethoxysilane, 2-mercaptoethylphenyl trimethoxysilane, 2-mercaptoethylphenyl triethoxysilane, 2-mercaptoethyltolyl trimethoxysilane, 2-mercaptoethyltolyl triethoxysilane, 3-mercaptopropylphenyl trimethoxysilane, 3-mercaptopropylphenyl triethoxysilane, and the like; aminosilanes (a)(2)(ii) such as 3-aminopropyltrimethoxysilane, 3-aminopropyltriethoxysilane, 4-aminobutyltriethoxysilane, N-phenyl-3-aminopropyltrimethoxysilane, N-methyl-3-aminopropyltrimethoxysilane, bis-(3-trimethoxysilyl-2-methylpropyl)amine, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropyl-methyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethyl-butyldimethoxymethylsilane, N-ethyl-4-amino-3,3-dimethylbutyltrimethoxysilane, N-(cyclohexyl)-3-aminopropyltrimethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, aminopropyltriethoxysilane, bis-(3-trimethoxysilyl-2-methylpropyl)amine, N-(3'-trimethoxysilylpropyl)-3-amino-2-methylpropyltri-methoxysilane, N-(α-methyldimethoxysilylmethyl)amine, N-(α-trimethoxysilylmethyl)amine, N-(α-diethylmethoxysilylmethyl)amine, N-(α-ethyldimethoxysilylmethyl)amine, N-(α-methyldiethoxysilylmethyl)amine, N-(α-triethoxysilylmethyl)amine, N-(α-ethyldiethoxysilylmethyl) amine, N-(α-methyldimethoxysilylethyl)amine, N-(α-trimethoxysilylethyl)amine, N-(α-ethyldimethoxysilylethyl) amine, N-(α-methyldiethoxysilylethyl)amine, N-(α-trimethoxysilylethyl)amine, N-(α-ethyldiethoxysilylethyl) amine, dibutyl maleate adduct of 3-aminopropyltrimethoxy silane, dibutyl maleate adduct of 4-amino-3,3-dimethylbutyltrimethoxysilane, and the like; and, ureidosilanes (a)(2)(iii) such as 3-ureidopropyltrimethoxysilane, 3-ureidopropyltriethoxysilane, 3-ureidopropylmethyldimethoxysilane, and the like.

Polyurea (b) which is silylated with one or more of the foregoing amine-reactive silanes (a)(1) or isocyanate-reactive silanes (a)(2) to provide silylated polyurea of this invention or mixture thereof is itself obtained by reacting at least one polyamine (c) with at least one polyisocyanate (d). When, in a given reaction medium, polyamine (c) is present in stoichiometric excess, the resulting polyurea (b) will be amine-terminated polyurea (b)(1) and, conversely, when polyisocyanate (d) is present in stoichiometric excess, resulting polyurea (b) will be isocyanate-terminated polyurea (b)(2). In preparing intermediate polyurea (b), it may be advantageous for some applications of the silylated polyurea product to reduce the content of any residual, i.e., unreacted, polyamine (c) or polyisocyanate (d), as the case may be, in the polyurea, e.g., to a level of not greater than 2, and preferably not great than 1, weight percent therein employing any known or conventional technique such as the use of falling film evaporation, wiped film evaporation, distillation, extraction with various solvents, the use of molecular sieves and the use of various organic reagents. These kinds of procedures have been utilized for reducing the levels of unreacted polyisocyanates in the production of polyurethane prepolymers (see, e.g., U.S. Pat. Nos. 5,202,001, 5,03,193, 6,664,193 and 6,903,167, the entire contents of which are incorporated by reference herein) and can be readily adapted for achieving the optional reduction of the content of residual polyamine (c) or polyisocyanate (d) in polyurea (b).

Any of the numerous known and conventional polyamines heretofore employed in the preparation of polyureas are suitable for use herein as polyamine (c) for the preparation of polyurea (b). In one embodiment, polyamine (c) may be represented by the general formula:

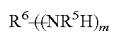

wherein each $R^5$ is independently H or a monovalent group, $R^6$ is an organic group of valence m, or $R^5$ and $R^6$ and/or two $R^5$ groups are bonded together to form a ring, and m is from 2 to 5, preferably 2 or 3 and more preferably 2, there being no significant number of urethane linkages or hydroxyl groups present in polyamine (c). Mixtures of polyamines with an average value of m which is equal to or greater than 2 may be used to achieve specific properties in the moisture-cured resins such as increased cohesive strength.

Depending on the nature of organic group $R^6$, polyamine (c) can be monomeric (understood herein to be a relatively low molecular weight compound, e.g., one having a molecular weight of not greater than 350 and preferably not greater than 150), oligomeric or polymeric, and the amine groups can all be primary amine groups, secondary amine groups or a combination of primary and secondary amine groups. Polyamine (c) is preferably a diamine and/or possesses predominantly or exclusively secondary amine groups. More preferably, polyamine (c) is a secondary diamine.

Mixtures of two or more polyamines (c) in any ratio can, of course, be utilized herein in the manufacture of polyurea (b). Thus, e.g., mixtures of at least one monomeric polyamine (c) and at least one oligomeric and/or polymeric polyamine (c) are useful as are mixtures of polyamine(s)(c) possessing primary amine groups and polyamine(s)(c) possessing secondary amine groups, mixtures of at least one aliphatic polyamine (c) and at least one aromatic polyamine (c) and mixtures of at least one diamine and at least one higher polyamine, e.g., triamine.

Some examples of suitable monomeric polyamines (c), including several preferred monomeric secondary diamines, are:
N,N-diethyl-1,3-propane diamine, N,N-dimethyl-1,3-propane diamine, 1,2-diaminoethane, 1,4-diaminobutane, N,N'-dimethylethylene diamine, N,N'-diethylethylene diamine, hexamethylene diamine, 4,4'-methylenebis(2-methylcyclohexylamine), 5-amino-1,3,3-trimethylcyclohexanemethylamine, N-isopropyl(5-amino)-1,3,3-trimethylcyclohexanemethyl-N'-isopropylamine, 1,3-di(4- piperidyl)propane (DIPIP), N(2aminoethyl propylmethyldimethoxysilane (DAS), piperazine, 3-aminopyrolidine, 4-aminopiperidine, N,N'-dialkyl(methylene)dianiline, N,N'dialkyl(1,4-diamino)benzene, N,N'-bis(diisopropylmethyl) diaminoethane and N,N'-bis(t-butyl) diamino cyclohexane, tallow diamine, and mixtures thereof.

Oligomeric and polymeric polyamines (c), including secondary polyamines of these types which are preferred, are well known in the art and can advantageously be used for the preparation of polyureas (b) where lower viscosity silylated polyureas of the invention, e.g., those of from 5,000 to 100,000, and preferably from 20,000 to 80,000 cps, on a solids basis are desired as, e.g., in such applications as sealants.

The oligomeric polyamines typically possess a number average molecular weight of not greater than about 3,000 while the polymeric polyamines possess a number average molecular weight above this value and up to 12,000 and preferably not exceeding 6,000. The oligomeric and polymeric polyamines (c) are usually derived from polyols, preferably diols, in accordance with any of numerous known and conventional processes, e.g., those involving reductive amination with ammonia or primary amines. While one or more of such processes might result in the production of polyamines containing some small amount of residual hydroxyl functionality which, following reaction with polyisocyanate (d), will result in the presence of some equally small number of urethane linkages in product polyurea (b), the number of such urethane linkages tends to be quite small in relationship to the much larger number of urea linkages. In general, the equivalent percent of urea linkages in the case of polyamines (c) derived from oligomeric and/or polymeric polyols will be at least 80 percent and preferably will be considerably higher, e.g., 90 to 100 percent, the latter value indicating the absence of any detectable urethane group(s) depending on how a particular polyamine (c) is made.

The backbones of oligomeric and polymeric polyamines (c) can, e.g., be entirely or predominantly those of polyethers (both alkylene oxide-based and tetramethylene oxide-based), polyesters, polycarbonates, polyamides, polyureas, polybutadienes and alkoxylated polybutadienes (unsaturated as well as partially and substantially fully saturated), elastomers such as acrylonitrile-butadiene copolymers, styrene-butadiene copolymers, and the like. See, in this regard, the polyamines disclosed in U.S. Pat. Nos. 4,658,062; 4,721,754; 4,946,924; 4,994,621; 5,015,774; 5,093,528; 5,362,913; 6,831,136; 6,855,776; 6,958,379; 7,074,963; and, 7,276,570, the entire contents of which are incorporated by reference herein. Polyarnines (c) derived from polyether polyols, especially polyether diols, polybutadiene diols and elastomeric diols such as those derived from acrylonitrile-butadiene copolymers and styrene-butadiene copolymers, and amine-terminated polyamides obtained from the condensation of polyamines and fatty acids, are preferred for use herein and of these polyamines, the secondary polyamines are generally more preferred. Some commercially available polymeric polyamines (c) that can be used herein are the Jeffarnine® series of alkylene oxide-based polyetheramines (Huntsman), Dynamar™ tetrarnethylene oxide-based polyether diamine HC1101 (3M), Versalink® tetramnethylene oxide-based polyether diamines P-250, P-650, P-1000 (Air Products), Hycar® secondary amine-terminated acrylonitrile-butadiene copolymers (Emerald Performance Materials) and the Versamid® series of amine-terminated polyamides (Cognis).

If desired, small amounts of one or more different polyamines (c), preferably diamines and more preferably secondary diamines such as any of the monomeric diamines (c) mentioned above, may optionally be employed as chain extenders, e.g., at a level of from 0.5 to 10 weight percent based on the total weight amount of polyamine(s)(c).

Any of the numerous known and conventional polyisocyanates heretofore employed in the preparation of polyureas are suitable for use herein as polyisocyanate (d) for the preparation of polyurea (b). In one embodiment, polyisocyanate (d) may be represented by the general formula:

wherein $R^7$ is a polyvalent organic group of valence n, e.g., a hydrocarbon residue of up to 24 carbon atoms, or a polymeric chain containing no significant number of urethane linkages and n is from 2 to 5, preferably 2 or 3 and more preferably 2.

Any of numerous polyisocyanates (d), preferably diisocyanates, and mixtures thereof, can be reacted with the selected polyamines (c) and optional polyamine chain extender(s) to provide polyurea (b).

Exemplary polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("H. sub. 12MDI"), p-phenylene diisocyanate ("PPDI"), m-phenylene diisocyanate ("MPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,1 2-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; isocyanurate of HDI; triisocyanate of 2,4,4-trimethyl-1,6-hexane diisocyanate ("TMDI"), tetracene diisocyanate, naphthalene diisocyanate, anthracene diisocyanate, tris(4-isocyanatophenyl)methane (Desmodur R), 1,3,5-tris(3-isocyanato-4-methylphenyl)-2,4,6-trioxohexahydro-1,3,5-triazine (Desmodur IL); N-isocyanatohexylaminocarbonyl N,N'-bis(isocyanatohexyl)urea (Desmodur N), 2,4,6-trioxo-1,3,5-tris(6-isocyanato-hexyl)hexa-hydro-1,3,5-triazine (Desmodur N3390), 2,4,6-tirioxo-1,3,5-tris(5-isocyanato-1,3,3-trimethylcyclohexylmethyl)hexa hydro-1,3,5-triazine (Desmodur N4370), 4,4'-dimethyldiphenymethane-2,2',5,5-tetraisocyanate, 4-methyldiphenylmethane-3,5,2',4',6'-pentaisocyanate, and the like.

So-called "perfect prepolymers," oligomeric polyisocyanates and/or polymeric polyisocyanates can also be used to make polyurea(s)(b) provided they avoid introducing individually or in admixture a number of urethane linkages into the moisture-curable silylated polyurea(s) of the invention that would reduce the equivalent percent of urea linkages therein to below 80 percent. Perfect prepolymers, i.e., isocyanate-terminated polyurethane prepolymers having a reacted isocyanate content substantially that of stoichiometric mole ratio of diisocyanate to diol of 2:1 and containing minimum amounts of unreacted diisocyanate (typically, less than 1 weight percent) and oligomer (typically, less than 10 weight percent), are disclosed, inter alia, in U.S. Pat. Nos. 4,786,703, 4,892,920, 6,866,743 and 6,884,904, the entire contents of which are incorporated by reference herein. Oligomeric polyisocyanates can be regarded as those having a number average molecular weight of not greater than about 2,000 while the polymeric polyisocyanates can be regarded as those having a number average molecular weight above this value up to 12,000 and preferably not exceeding 6,000. The polyisocyanates may or may not possess isocyanurate groups.

Included among the useful oligomeric and polymeric polyisocyanates are those obtained by reacting a stoichiometric excess of monomeric polyisocyanate(s)(d), e.g., any of those previously mentioned, with polyamine(s) also containing no significant number of urethane linkages, e.g., any of monomeric, oligomeric and/or polymeric polyamine(s)(c) previously mentioned, thereby providing isocyanate-terminated polyurea(s) for reaction with the same or different polyamine(s)(c) to provide polyurea(s)(b). See, e.g., U.S. Pat. No. 4,686,242, the entire contents of which are incorporated by reference herein.

Like the perfect prepolymers described above, useful isocyanate-terminated polyureas can possess a reacted isocyanate content substantially that of stoichiometric mole ratio of diisocyanate to diamine (preferably secondary diamine) of 2:1 and similarly low levels of unreacted diisocyanate and oligomer. These analogously perfect prepolymers can either be reacted with polyamine to provide amine-terminated or isocyanate-terminated polyurea (b)(depending on the stoichiometrics employed) for subsequent silylation with organofunctional silane (a) or they can be directly silylated with isocyanate-reactive silane (a)(2) to provide moisture-curable silylated polyurea(s) in accordance with the invention.

The reaction of polyamine(s)(c) with polyisocyanate(s)(d) to provide polyurea(s)(b) can be carried out in accordance with known and conventional procedures, e.g., in the presence or absence of solvent, by gradual addition of polyamine(s)(c) and optional polyamine chain extender(s), if utilized, to polyisocyanate(s)(d) accompanied by agitation of the mixture, the use of low to moderate temperatures, e.g., from −10° to 100° C., and preferably from 15° to 55° C., until all, or nearly all, of the amine groups in polyamine(s)(c) and any polyamine chain extender(s) have been consumed (the case when preparing isocyanate-terminated polyurea(s)(b) (2)), or all, or nearly all, of the isocyanate groups in polyisocyanate(s)(d) have been consumed (the case when preparing amine-terminated polyurea(s)(b)(1)), which in most cases occurs rapidly upon contact of the amine groups with the isocyanate groups. Once at least the minimum level of polyurea(s)(b) has been achieved, silylation of polyurea(s)(b), and any unreacted polyamine(s)(c) or polyisocyanate(s)(d), whichever may be present, may be carried out by contacting polyurea(s)(b) with organofunctional silane(s)(a) under silylation reaction conditions to provide moisture-curable silylated polyurea(s) of the invention. In any event, silylation of polyurea(s)(b) should not be carried out before at least 80, and preferably at least 90, weight percent of the theoretical maximum amount of polyurea(s)(b) has been obtained.

It may be advantageous to silylate less than all of the terminal reactive groups of polyurea (b) by capping a number of these groups with a monofunctional capping reactant. Thus, when polyurea (b) is amine-terminated polyurea (b)(1), the desired number of amine groups can be capped with a monoisocyanate, e.g., a lower alkyl, aryl or aralkyl isocyanate such as methyl-, ethyl-, propyl-, isopropyl-, butyl-, etc., isocyanate, phenylisocyanate, benzyl isocyanate, monoepoxy, e.g., allyl glycidoxy ether, mono(meth)acrylate, e.g., methylmethacrylate, ethylmethacrylate, acryloylmorpholine, and the like, prior to and/or during the silylation reaction. Similarly, when polyurea (b) is isocyanate-terminated polyurea (b)(2), the desired number of isocyanate groups can be capped with a monoamine, e.g., alkyl amine such as N-ethylbutylamine, dimethylamine, dipropylamine, dibutylamine, N-ethyl-2-methylallylamine, diallylamine, and the like, prior to and/or during the silylation reaction. Use of such capping reactants provides the ability to adjust the degree of silylation of the silylated polyurea end product. Thus, e.g., capping agent can be used to provide a silylated polyurea containing no more than 5 percent by weight silicon based upon the total solids content.

The silylation of polyurea(s)(b) with silane(s)(a) can be carried out in accordance with known and conventional practice, e.g., under anhydrous conditions, at sub-ambient, ambient or elevated temperatures, at reduced, atmospheric or high pressures, and in the presence or absence of solvent(s) and/or catalyst(s). Anhydrous conditions include the use of dry air, and preferably an inert atmosphere such as a blanket of nitrogen, to prevent premature hydrolysis of the hydrolyzable group(s) of silane (a). Typical silylation reaction temperatures range from 0° to 150° C., preferably from 25° to 100° C., and more preferably from 60° to 90° C. Typical silylation reaction pressures range from 0.1 mm Hg to 10 bars, preferably from 10 mm Hg to 2 bars, and more preferably from 600 mm Hg to 1 bar. Typical solvents include hydrocarbons some specific examples of which include ethyl acetate, toluene, hexanes, cyclohexanes, and the like. Optionally a catalyst may be employed to facilitate the condensation of the hydrolyzed silylated polyurea(s) herein. Useful catalysts include transition metal salts, dialkyltin carboxylates such as dibutyltin diacetate and dibutyltin dilaurate, stannous salts of carboxylic acids such as stannous octanoate and stannous acetate, stannous oxides, bismuth salts and tertiary amines, employed in the usual amounts.

For some applications, it may be desirable to introduce some level of branching into intermediate polyurea (b), such being readily accomplished through the presence of one or more higher functionality reactants, e.g., triamines, triisocyanates and/or trifunctional chain extenders, in the polyurea-forming reaction medium. The selection and optimal amounts of such higher functionality reactants for a particular application of the ultimate moisture-curable silylated polyurea(s) of the invention can be readily determined employing routine experimental testing.

When, in accordance with one embodiment of the invention, a molar excess of a secondary diamine, e.g., p+1 moles where p is 1 or 2, of the general formula:

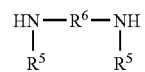

wherein each $R^5$ is the same or different monovalent group, e.g., methyl, ethyl, etc., and $R^6$ is a divalent organic group of monomeric, oligomeric or polymeric structure, is reacted with p moles of a diisocyanate of the general formula:

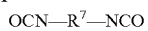

wherein $R^7$ is a divalent organic group of monomeric, oligomeric or polymeric structure, the resulting secondary amine-terminated polyurea (b)(1) may be represented by general formula I:

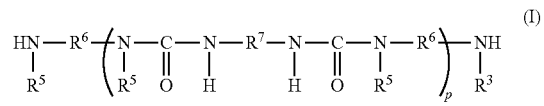

On subsequent silylation of polyurea (I) with an isocyanatosilane of the general formula:

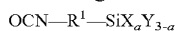

wherein $R^1$, X, Y and a have the aforestated meanings, the resulting moisture-curable silylated polyurea within the scope of the invention may be represented by general formula II:

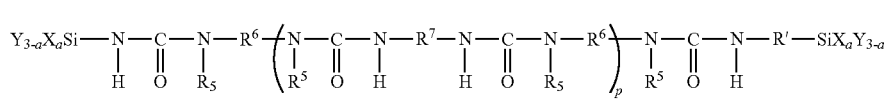

When, in the foregoing reaction scheme and in accordance with another embodiment of the invention, the diisocyanate is present in molar excess, the resulting isocyanate-terminated polyurea (b)(2) may be represented by general formula III:

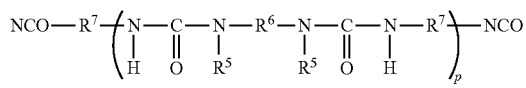

On subsequent silylation of polyurea III with a secondary aminosilane of the general formula:

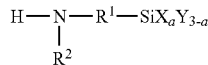

wherein $R^1$, $R^2$, X, Y and a have the aforestated meanings, the resulting moisture-curable silylated polyurea within the scope of the invention may be represented by general formula IV:

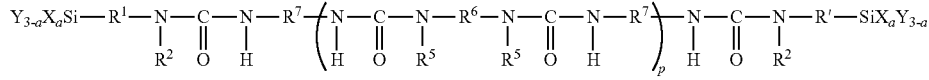

The present invention also relates to the use of the moisture-curable silylated polyurea herein in the formulation of coating, sealing or adhesive compositions. For practical application, the moisture-curable silylated polyurea can contain typical additives such as pigments, fillers, curing catalysts, dyes, plasticizers, thickeners, coupling agents, extenders, adhesion promoters, tackifiers, antioxidants, UV stabilizers, and the like. Suitable fillers include, but are not limited to, isocyanate-inert inorganic compounds such as, for example, chalk, lime flour, precipitated and/or pyrogenic silica, aluminum silicates, ground minerals and other inorganic fillers familiar to one skilled in the art. In addition, organic fillers, particularly short-staple fibers and the like, may also be used. Fillers that impart desirable thixotropic properties, e.g., swellable polymers, may be utilized for certain applications.

The invention is illustrated by the following non-limiting examples.

EXAMPLE 1

This example illustrates the silylation of a secondary amine-terminated polyurea prepolymer (98 equivalent % urea linkages) with an isocyanatosilane to provide a silylated polyurea in accordance with the invention and the preparation of a pressure sensitive adhesive composition containing same.

To a reactor provided with stirrer, nitrogen atmosphere and heater were introduced under agitation 100.0 g of secondary amine-terminated polyoxypropylenediamine, Jeffamine® SD-2001 (XTJ-576) having an amine value of 0.978 meq/g, and 165.0 g ethyl acetate. A mixture of 9.4 g of isophorone diisocyanate and 1.7 g polyisocyanate Desmodur® Z-4470BA (NCO/NH=0.945) to introduce branching in the polyurea was added dropwise with agitation 26-30° C. Wt % NH determined per standard methodology was found to be 0.03 wt %. At this point, 1.2 g of 3-isocyanatopropyltrimethoxysilane was added and agitation continued at 45° C. for about 2 hours to provide silylated polyurea. Titrations for NCO and NH were below detection limits. Solids were measured 39.8 wt % and viscosity 115 cps using a Brookfield HATDV-II, spindle 2 at 50 rpm.

An approximately 40 g sample of the silylated polyurea dissolved in 6 g of ethyl acetate was combined with 0.2 g water and 150 ppm of tin as dimethyltin bis[(1-oxoneodecyl)oxy]stannane dissolved in toluene, mixed thoroughly then allowed to set for 30 minutes at which time the pressure sensitive adhesive solution was bar-coated onto 50 micron polyethylene terephthalate (PET) film. After a 10-minute air-dry period, the coated film was placed in a 135° C. oven for 5 minutes. Adhesive thickness measured 47 microns. The coated film was tested after one week. Probe tack results for 100 g/cm² applied force was 635 g/cm² and at 1000 g/cm² applied force was 656 g/cm². Loop Tack per PSTC-16 method was 993 g. Peel Adhesion (PSTC-101) for 1 inch tapes allowed a 20 minute dwell time prior to testing and peeled at 300 mm/minute and 180 degrees was 308 g/25 mm. Solvent lap shear samples prepared with 1.0 inch×1.0 inch overlap on a glass slide and 10 g weight attached were placed in stirred xylene using a jig to achieve a 2° off-set from vertical. Time to failure was >24 hours and adhesive thickness swell factor was 3.9 times the non-xylene exposed control. Samples of 1.0×1.0 inch labels were found to adhere to skin and could be removed and re-applied up to six times to fresh areas of skin without apparent loss of adhesion. Similarly prepared labels remained adhered to skin for 24 hours even during exercise and bathing without apparent adhesion loss. At the end of the 24-hour period, the labels could be removed without detriment to the contacted area and re-applied to another area of skin while retaining adhesion.

EXAMPLE 2

This example illustrates the silylation of a primary amine-terminated polyurea prepolymer (98 equivalent % urea linkages) with an isocyanatosilane to provide a silylated polyurea of the invention and the preparation of a pressure sensitive adhesive composition containing same.

To a reactor provided with stirrer, nitrogen atmosphere and heater were introduced under agitation 25.0 g of primary amine-terminated polyoxytetramethylenediamine, Jefflink® XTJ-559, having an amine value of 1.39 meq/g, 31.9 g ethyl acetate and 31.9 g toluene. A mixture of 937 g of isophorone diisocyanate and 3.7 g toluene (NCO/NH=0.95) was added dropwise with agitation at 26-30° C. Wt % NH determined per standard methodology was found to be 0.03 wt %. At this point 0.4 g of 3-isocyanatopropyltrimethoxysilane was added and agitation continued at 45° C. overnight to provide silylated polyurea. Titrations for NCO and NH were below detection limits. Solids measured 31.0 wt % and viscosity 17500 cps using a Brookfield HATDV-II, spindle 2 at 50 rpm.

An approximately 40 g sample of the silylated polyurea dissolved in 6 g of ethyl acetate was combined with 0.2 g water and 150 ppm of tin as dimethyltin bis[(1-oxoneodecyl)oxy]stannane dissolved in toluene, mixed thoroughly and allowed to set for 30 minutes at which time the pressure sensitive adhesive solution was bar-coated onto 50 micron PET film After a 10-minute air-dry period, the coated film was placed in a 135° C. oven for 5 minutes. Adhesive thickness measured 50 microns. The coated film was tested after one week. Probe tack results for 100 g/cm$^2$ applied force was 393 g/cm$^2$ and at 1000 g/cm$^2$ applied force was 425 g/cm$^2$. Peel Adhesion (PSTC-101) for 1 inch tapes allowed a 20 minute dwell time prior to testing, and peeled at 300 mm/minute at 180 degrees was 3350 g/25 mm. Solvent lap shear samples prepared with 1.0 inch×1.0 inch overlap on a glass slide and 10 g weight attached were placed in stirred xylene using a jig to achieve a 20 off-set from vertical. Time to failure was >24 hours and adhesive thickness swell factor was 4.5 times the non-xylene exposed control.

EXAMPLE 3

This example illustrates the silylation of a secondary amine-terminated polyurea prepolymer (99 equivalent % urea linkages) with an isocyanatosilane to provide a silylated polyurea of the invention and the preparation of a contact adhesive composition containing same for use in metal-to-metal bonding operations.

To a reactor provided with stirrer, nitrogen atmosphere and heater were introduced under agitation 50.0 g of secondary amine-terminated polyoxypropylenediamine, Jefflink® XTJ-585, having an amine value of 3.75 meq/g, and 109.0 g ethyl acetate. A mixture of 19.3 g of isophorone diisocyanate and 1.7 g polyisocyanate Desmodur® Z-4470BA (NCO/NH=0.975) was added dropwise with agitation at 26-30° C. Wt % NH determined per standard methodology was found to be 0.04 wt %. At this point 1.0 g of 3-isocyanatopropyltrimethoxysilane was added and agitation continued at 45° C. overnight to provide silylated polyurea. Titrations for NCO and NH were below detection limits. Solids measured 37.9 wt % and viscosity 150 cps using a Brookfield HATDV-II, spindle 2 at 50 rpm.

An approximately 40 g sample of the silylated polyurea dissolved in 6 g of ethyl acetate was combined with 0.2 g water and 150 ppm of tin as dimethyltin bis[(1-oxoneodecyl)oxy]stannane dissolved in toluene, mixed thoroughly and allowed to set for 30 minutes at which time the bonding solution was bar-coated onto 50 micron PET film After a 10-minute air-dry period, the coated film was placed in a 135° C. oven for 5 minutes. A siliconized release liner was applied to the film after which the reverse side of the film was coated with adhesive solution and dried/cured as before. A second release liner was applied and the construction tested after one week. Adhesive thickness measured 47 microns on both sides. Lap shear samples were prepared with 1.0 inch×1.0 inch overlap on 1.0 inch×3.0 inch anodized aluminum panels and given a 24 hour dwell time. The lap shear samples were pulled using a Monsanto Tensometer 10 at a rate of 0.5 inch per minute at 180 degrees. Average lap shear result was 322 psi. Probe tack results for 100 g/cm$^2$ and 1000 g/cm$^2$ applied force were <50 g/cm$^2$. Peel Adhesion (PSTC-101) for 1 inch tapes applied to, and allowed 20 minute dwell prior to testing, and peeled at 300 mm/minute at 180 degrees was >3500 g/25 mm.

EXAMPLE 4

This example illustrates the silylation of an isocyanate-terminated polyurea prepolymer (98 equivalent % urea linkages) with an isocyanatosilane to provide a silylated polyurea of the invention and the preparation of a barrier coating composition containing same.

To a reactor provided with stirrer, nitrogen atmosphere and heater were introduced under agitation 18.0 g of isophorone diisocyanate and 72.1 g toluene. A mixture of 25.0 g of secondary amine-terminated polyoxypropylenediamine, Jefflink® XTJ-584, having an amine value of 5.8 meq/g, and 27.9 g toluene was added dropwise with agitation (NCO/NH=1.1). Wt % NCO determined per standard methodology was found to be 0.42 wt %. At this point, 3.1 g of N-ethylaminoisobutyltrimethoxysilane was added with agitation followed by heating at 45° C. for 1-2 hours to provided silylated polyurea. Titrations for NCO and NH were below detection limits. Solids measured 30.7 wt % and viscosity 1080 cps using a Brookfield HATDV-II, spindle 2 at 50 rpm.

An approximately 40 g sample of the silylated polyurea dissolved in 6 g of ethyl acetate was combined with 0.2 g water and 50 ppm of tin as dimethyltin bis[(1-oxoneodecyl)oxy]stannane dissolved in toluene, mixed thoroughly and allowed to set for 30 minutes at which time the barrier coating solution was flow-coated onto cold roll steel panels (Act Laboratories, Inc. APR10009) followed by a cure of 15 minutes at approximately 135° C. One week later, the panels were tested for cross-hatch adhesion which measured 5B, and pencil hardness which measured 4H.

EXAMPLE 5

This example illustrates the silylation of a primary amine-terminated polyurea prepolymer (100 equivalent % urea linkages) with an isocyanatosilane to provide a silylated polyurea of the invention and the preparation of a barrier coating composition containing same.

To a reactor provided with stirrer, nitrogen atmosphere and heater were introduced under agitation 10.0 g 1,7-diaminoheptane and 33.3 g dimethylformamide. A mixture of 8.6 g of isophorone diisocyanate and 20.0 g dimethylformamide was added dropwise with agitation (NCO/NH=0.5). Wt % NH determined per standard methodology was found to be 1.23 wt %. At this point, 15.8 g of 3-isocyanatopropyltrimethoxysilane was added with agitation and heated at 80° C. for 6 hours to provide silylated polyurea. Titrations for NCO and NH were below detection limits. Solids measured 30.2 wt % and viscosity 16 cps using a Brookfield HATDV-II, spindle 4 at 100 rpm.

An approximately 40 g sample of the silylated polyurea dissolved in 6 g of ethyl acetate was combined with 0.2 g water and 50 ppm of tin as dimethyltin bis[(1-oxoneodecyl)

oxy]stannane dissolved in toluene, mixed thoroughly and allowed to set for 30 minutes at which time the barrier coating solution was flow-coated onto cold roll steel panels (Act Laboratories, Inc. APR10009) followed by a cure of 5 minutes at approximately 150° C. One-week later, the panels were tested for crosshatch adhesion which measured 5B, pencil hardness which measured 5H, and passed a 0.25-inch mandrel bend.

EXAMPLE 6

This example illustrates the silylation of an isocyanate-terminated polyurea prepolymer (98 equivalent % urea linkages) with a secondary aminosilane to provide a silylated polyurea of the invention and the preparation a primer composition containing same.

To a reactor provided with stirrer, nitrogen atmosphere and heater were introduced 50.0 g of secondary amine-terminated polyoxypropylenediamine, Jefflink® XTJ-585, having an amine value of 3.75 meq/g, and 109.0 g ethyl acetate. A mixture of 19.3 g of isophorone diisocyanate and 1.7 g polyisocyanate Desmodur® Z-4470BA (NCO/NH=0.975) was added dropwise with agitation at 26-30° C. Wt % NH determined per standard methodology was found to be 0.04 wt %. At this point, 1.0 g of 3-isocyanatopropyltrimethoxysilane was added and agitation continued at 45° C. overnight to provide silylated polyurea. The wt % as Si(28) at 100 wt % solids was 0.18 wt %. Titrations for NCO and NH were below detection limits. Solids measured 37.9 wt % and viscosity 150 cps using a Brookfield HATDV-II, spindle 2 at 50 rpm. To the silylated polyurea was added 0.05 wt % 3-aminopropyltrimethoxysilane and 0.05 wt % 3-glycidoxypropyltrimethoxysilane. After mixing, the primer solution was bar-coated onto 50 micron polyetheretherketone (PEEK) film and allowed to air-dry for 10 minutes after which a silylated hot-melt type adhesive composition prepared in accordance with commonly owned U.S. patent application Ser. No. 11/515,444, filed Sep. 1, 2006, was coated onto the primed PEEK. After an additional 10-minute air-dry period, the coated PEEK film was placed in a 135° C. oven for 5 minutes. Tapes were cut to 1.0 inch×6.0 inch, adhesive-to-adhesive laminated then T-peeled at 0.5 inch per minute at 90 degrees using a Monsanto Tensometer 10. Adhesive-to-adhesive failure with no adhesive-to-film failure was observed indicating excellent adhesion to the film. A control without primer failed in adhesive-to-film indicating poor adhesion to the film.

EXAMPLE 7

This example illustrates the silylation of a primary amine-terminated polyurea prepolymer (97 equivalent % urea linkages) with an isocyanatosilane to provide a silylated polyurea of the invention and the preparation of a pressure sensitive adhesive composition containing same.

To a reactor provided with stirrer, nitrogen atmosphere and heater were introduced under agitation 25.0 g of primary amine-terminated polyoxytetramethylenediamine, Jefflink® XTJ-559 having an amine value of 1.39 meq/g, 31.9 g ethyl acetate and 31.9 g toluene. A mixture of 3.7 g of isophorone diisocyanate and 3.7 g toluene (NCO/NH=0.95) was added dropwise with agitation 26-30° C. Wt % NH determined per standard methodology was found to be 0.03 wt %. At this point, 0.4 g of 3-isocyanatopropyltrimethoxysilane was added and agitation continued at 45° C. overnight to provide silylated polyurea. Titrations for NCO and NH were below detection limits. Solids were determined to be 31.0 wt % and viscosity 17500 cps using a Brookfield HATDV-II, spindle 2 at 50 rpm. The wt % as Si (28) at 100 wt % solids was 0.18 wt %.

An approximately 40 g sample of the silylated polyurea dissolved in 6 g of ethyl acetate was combined with 0.2 g water and 150 ppm of tin as dimethyltin bis[(1-oxoneodecyl) oxy]stannane dissolved in toluene, mixed thoroughly and allowed to set for 30 minutes at which time the pressure sensitive adhesive solution was bar-coated onto 50 micron PET film. After a 10-minute air-dry period, the coated film was placed in a 135° C. oven for 5 minutes. Adhesive thickness measured 50 microns. The coated film was tested after one week. Probe tack results for 100 g/cm² applied force was 393 g/cm² and at 1000 g/cm² applied force was 425 g/cm². Peel Adhesion (PSTC-101) for 1 inch tapes allowed a 20 minute dwell time prior to testing and peeled at 300 mm/minute at 180 degrees was 3350 g/25nm. Solvent lap shear samples were prepared with 1.0 inch×1.0 inch overlap on a glass slide and 10 g weight attached thereafter were placed in stirred xylene using a jig to achieve a 2° off-set from vertical. Time to failure was >24 hours and adhesive thickness swell factor was 4.5 times that of a non-xylene exposed control.

EXAMPLE 8

This example illustrates the silylation of a primary amine-terminated polyurea (97 equivalent % urea linkages) with an isocyanatosilane to provide a silylated polyurea of the invention and the preparation of a pressure sensitive adhesive composition containing same.

To a reactor provided with stirrer, nitrogen atmosphere and heater were introduced under agitation 25.0 g of primary amine-terminated polyoxytetramethylenediamine, Jefflink® XTJ-559, having an amine value of 1.39 meq/g, 31.7 g ethyl acetate and 31.7 g toluene. A mixture of 3.5 g of isophorone diisocyanate and 3.5 g toluene (NCO/NH=0.89) was added dropwise with agitation at 26-30° C. Wt % NH determined per standard methodology was found to be 0.048 wt %. At this point, 0.6 g of 3-isocyanatopropyltrimethoxysilane was added and agitation continued at 45° C. overnight to provide silylated polyurea. Titrations for NCO and NH were below detection limits. Solids measured 29.8 wt % and viscosity 19200 cps using a Brookfield HATDV-II, spindle 2 at 50 rpm. The wt % as Si (28) at 100 wt % solids was 0.29 wt %.

An approximately 40 g sample of the silylated polyurea dissolved in 6 g of ethyl acetate was combined with 0.2 g water and 150 ppm of tin as dimethyltin bis[(1-oxoneodecyl) oxy]stannane dissolved in toluene, mixed thoroughly and allowed to set for 30 minutes at which time the pressure sensitive adhesive solution was bar-coated onto 50 micron PET film. After a 10-minute air-dry period, the coated film was placed in a 135° C. oven for 5 minutes. Adhesive thickness measured 37 microns. The coated film was tested after one and a half weeks. Probe tack results for 100 g/cm² applied force was 403 g/cm² and at 1000 g/cm² applied force was 420 g/cm². Peel Adhesion (PSTC-101) for 1 inch tapes allowed a 20 minute dwell time prior to testing and peeled at 300 mm/minute at 180 degrees was 1463 g/25 mm. Solvent lap shear samples were prepared with 1.0 inch×1.0 inch overlap on a glass slide and 50 g weight attached and thereafter placed in stirred xylene using a jig to achieve a 2° off-set from vertical. Time to failure was >24 hours and adhesive thickness swell factor was 4 times that of a non-xylene exposed control.

EXAMPLE 9

This example illustrates the silylation of a primary amine-terminated polyurea prepolymer (97 equivalent % urea linkages) with an isocyanatosilane to provide a silylated polyurea and an adhesive composition containing same.

To a reactor provided stirrer, nitrogen atmosphere and heater were introduced under agitation 25.0 g of primary amine-terminated polyoxytetramethylenediamine, Jeffamine® ED-900 (XTJ-501), having an amine value of 2.13 meq/g and 51.2 g isopropanol. A mixture of 5.8 g of isophorone diisocyanate, 9.4 g ethyl acetate and 9.4 g toluene (NCOINH=0.97) was added dropwise with agitation at 26-30° C. Wt % NH determined per standard methodology was found to be 0.016 wt %. At this point, 0.2 g of 3-isocyanatopropyltrimethoxysilane was added and agitation continued at 45° C. overnight to provide silylated polyurea. Titration for NCO and NH were below detection limits. Solids measured 31.0 wt % and viscosity 1380 cps using a Brookfield HATDV-II, spindle 2 at 50 rpm. The wt % as Si (28) at 100 wt % solids was 0.09 wt %.

An approximately 40 g sample of the silylated polyurea dissolved in 6 g of ethyl acetate was combined with 0.2 g water and 150 ppm of tin as dimethyltin bis[(1-oxoneodecyl)oxy]stannane dissolved in toluene, mixed thoroughly and allowed to set for 30 minutes at which time the adhesive solution was bar-coated onto 50 micron PET film. After a 10-minute air-dry period, the coated film was placed in a 135° C. oven for 5 minutes. Adhesive thickness measured 28 microns. The coated film was tested after one and a half weeks. Probe tack results for 100 g/cm$^2$ applied force was 590 g/cm$^2$ and at 1000 g/cm$^2$ applied force was 569 g/cm$^2$. Peel Adhesion (PSTC-101) for 1 inch tapes allowed a 20 minute dwell time prior to testing and peeled at 300 mm/minute at 180 degrees was 1873 g/25 mm. Solvent lap shear samples were prepared with 1.0 inch×1.0 inch overlap on a glass slide and 50 g weight attached and thereafter placed in stirred xylene using a jig to achieve a 2° off-set from vertical. Time to failure was >24 hours and adhesive thickness swell factor was twice that of a non-xylene exposed control.

EXAMPLE 10

This example illustrates the silylation of a secondary amine-terminated polyurea prepolymer (100 equivalent % urea linkages) with an isocyanatosilane to provide a silylated polyurea of the invention and the preparation of a pressure sensitive adhesive composition containing same.

To a reactor provided with stirrer, nitrogen atmosphere and heater were introduced under agitation added 80.0 g of secondary amine-terminated butadiene-acrylontitrile copolymer (Hycar 1300X45 ATBN®, Noveon), having an amine value of 0.56 meq/g, and 172.7 g butyl acetate. A mixture of 4.6 g isophorone diisocyanate and 14.9 g butyl acetate (NCO/NH=0.92) was added dropwise with agitation at room temperature. Temperature was increased to 70-80° C. for 2 hours after which the wt % NH determined per standard methodology was found to be 0.018 wt %. At this point, 0.7 g of 3-isocyanatopropyltrimethoxysilane was added and agitation continued at 45° C. overnight to provide silylated polyurea. Titration for NCO and NH were below detection limits. Solids were 27.9 wt % and viscosity 8320 cps measured with a Brookfield HATDV-II, spindle 4 at 50 rpm. The wt % as Si (28) at 100 wt % solids was 0.12 wt %.

An approximately 40 g sample of the silylated polyurea dissolved in 6 g of ethyl acetate was combined with 0.2 g water and 150 ppm of tin as dimethyltin bis[(1-oxoneodecyl)oxy]stannane dissolved in toluene to provide an adhesive solution which was then allowed to set for 30 minutes before being bar-coated onto a 50 micron PET film. After a 10-minute air-dry period, the coated film was placed in a 135° C. oven for 5 minutes. Cured adhesive thickness measured 25 microns. The coated film was tested after one week. Probe tack results for 100 g/cm$^2$ applied force was <50 g/cm$^2$ and at 1000 g/cm$^2$ applied force was <50 g/cm$^2$. Peel Adhesion (PSTC-101) for 1 inch tapes allowed a 20 minute dwell time prior to testing and peeled at 300 mm/minute at 180 degrees was 1345 g/25 mm. Solvent lap shear samples were prepared with 1.0 inch×1.0 inch overlap on a glass slide and 50 g weight attached and thereafter placed in stirred xylene using a jig to achieve a 2° off-set from vertical. Shear Adhesion Failure Temperature (SAFT) for 1.0 inch×1.0 inch overlap and 1 Kg weight at a 2° off-set from vertical was determined to be greater than 292° C.

EXAMPLE 11

This example illustrates the preparation of a tackifier-containing adhesive composition containing the silylated polyurea of claim 10.

The silylated polyurea of Example 10 was mixed with Sylvatac RE40® (Arizona Chemical), a rosin tackifier, in a 25/75 weight ratio based on solids to provide an adhesive composition which was then bar-coated on a 50 micron PET film and tested as above. Probe tack results for 100 g/cm$^2$ applied force was 369 g/cm$^2$ and peel adhesion was 1981 g/25 mm.

EXAMPLE 12

This example illustrates the silylation of an isocyanate-terminated polyurea prepolymer (98 equivalent % urea linkages) with a secondary aminosilane to provide a silylated polyurea of the invention and the preparation of a pressure sensitive adhesive composition containing same.

To a reactor provided with stirrer, nitrogen atmosphere and heater were introduced under agitation 6.2 g of isophorone diisocyanate, 12.4 g ethyl acetate and 12.4 g toluene. A mixture of 25.0 g of amine terminated polyoxytetramethylenediamine, Jeffamine® ED-900 (XTJ-501), each amine being primary, with amine value of 2.13 meq/g, and 47.8g isopropanol. (NCO/NH=1.03) was added dropwise with agitation at 26-30° C. Wt % NCO determined per standard methodology was found to be 0.017 wt %. At this point, 0.25 g of N-ethylaminoisobutyltrimethoxysilane was added and agitation continued at 45° C. overnight to provide silylated polyurea. Titration for NCO and NH were below detection limits. Solids measured 29.4 wt % and viscosity 890 cps using a Brookfield HATDV-II, spindle 2 at 50 rpm. The wt % as Si (28) at 100 wt % solids was 0.11 wt %.

An approximately 40 g sample of the silylated polyurea was dissolved in 6 g of ethyl acetate and combined with 0.2 g water and 150 ppm of tin as dimethyltin bis[(1-oxoneodecyl)oxy]stannane dissolved in toluene, mixed thoroughly and allowed to set for 30 minutes at which time the pressure sensitive adhesive solution was bar-coated onto 50 micron PET film After a 10-minute air-dry period, the coated film was placed in a 135° C. oven for 5 minutes. Adhesive thickness measured 36 microns. The coated film was tested after one and a half weeks. Probe tack results for 100 g/cm$^2$ applied force was 398 g/cm$^2$ and at 1000 g/cm$^2$ applied force was 372 g/cm$^2$. Peel Adhesion (PSTC-101) for 1 inch tapes allowed a 20 minute dwell time prior to testing and peeled at 300 mm/minute at 180 degrees was 1586 g/25 mm. Solvent lap shear samples were prepared with 1.0 inch×1.0 inch overlap on a glass slide and 50 g weight attached and thereafter placed in stirred xylene using a jig to achieve a 2° off-set from vertical. Time to failure was >24 hours and adhesive thickness swell factor was 1.5 times that of a non-xylene exposed control.

EXAMPLE 13

This example illustrates the silylation of a secondary amine-terminated polyurea prepolymer (98 equivalent % urea linkages) with an epoxysilane to provide a silylated polyurea of the invention and the preparation of a pressure sensitive adhesive composition containing same.

To a reactor provided with stirrer, nitrogen atmosphere and heater were introduced under agitation 100.0 g of secondary amine-terminated polyoxypropylenediamine, Jeffamine® SD-2001 (XTJ-576) having an amine value of 0.978 meq/g, and 112.2 g butyl acetate. A mixture of 10.6 g of isophorone diisocyanate and 10.6 g butyl acetate (NCO/NH=0.98) was added dropwise with agitation at 26-30° C. and a 500 rpm agitation rate. Wt % NH determined per standard methodology was found to be 0.059 wt %. At this point, 2.7 g of gamma-glycidoxypropyltrimethoxysilane was added and agitation continued at 45° C. for about 2 hours to provide silylated polyurea. Titrations for NCO and NH were below detection limits. Solids measured 61.4 wt % and viscosity 544 cps using a Brookfield HATDV-II, spindle 3 at 50 rpm.

An approximately 40 g sample of the silylated polyurea dissolved in 6 g of ethyl acetate was combined with 0.2 g water and 150 ppm of tin as dimethyltin bis[(1-oxoneodecyl)oxy]stannane dissolved in toluene, mixed thoroughly and allowed to set for 30 minutes at which time the solution was bar-coated onto 50 micron PET film. After a 10-minute air-dry period, the coated film was placed in a 135° C. oven for 5 minutes. Adhesive thickness measured 35 microns. The coated film was tested after one week. Probe tack results for 100 g/cm$^2$ applied force was 535 g/cm$^2$ and at 1000 g/cm$^2$ applied force was 607 g/cm$^2$. Peel Adhesion (PSTC-101) for 1 inch tapes allowed a 20 minute dwell time prior to testing and peeled at 300 mm/minute at 180 degrees was 723 g/25 mm.

EXAMPLE 14

This example illustrates the silylation of a secondary amine-terminated polyurea prepolymer (98 equivalent % urea linkages) with a methacryloxysilane to provide a silylated polyurea of the invention and the preparation of a pressure sensitive adhesive composition containing same.

To a reactor provided with stirrer, nitrogen atmosphere and heater were introduced under agitation 100.0 g of secondary amine-terminated polyoxypropylenediamine, Jeffamine® SD-2001 (XTJ-576) having an amine value of 0.978 meq/g, and 112.2 g butyl acetate. A mixture of 9.9 g of isophorone diisocyanate and 9.9 g butyl acetate (NCO/NH=0.97) was added dropwise with agitation at 26-30° C. and a 500 rpm agitation rate. Wt % NH determined per standard methodology was found to be 0.061 wt %. At this point, 2.4 g of methacryloxypropyltrimethoxysilane was added and agitation continued at 45° C. for about 2 hours to provided silylated polyurea. Titrations for NCO and NH were below detection limits. Solids measured 61.4 wt % and viscosity 544 cps using a Brookfield HATDV-II, spindle 3 at 50 rpm.

An approximately 40 g sample of the silylated polyurea dissolved in 6 g of ethyl acetate was combined with 0.2 g water and 150 ppm of tin as dimethyltin bis[(1-oxoneodecyl)oxy]stannane dissolved in toluene, mixed thoroughly and allowed to set for 30 minutes at which time the adhesive solution was bar-coated onto 50 micron PET film. After a 10-minute air-dry period, the coated film was placed in a 135° C. oven for 5 minutes. Adhesive thickness measured 38 microns. The coated film was tested after one week. Probe tack results for 100 g/cm$^2$ applied force was 411 g/cm$^2$ and at 1000 g/cm$^2$ applied force was 503 g/cm$^2$. Peel Adhesion (PSTC-101) for 1 inch tapes allowed a 20 minute dwell time prior to testing and peeled at 300 mm/minute 180 degrees was 420 g/25 mm.

EXAMPLE 15

This example illustrates silylation of a secondary amine-terminated polyurea prepolymer (100 equivalent % urea linkages) with an isocyanatosilane to provide a silylated polyurea of the invention and the incorporation of the silylated polyurea in a sealant composition.

To a reactor provided with stirrer and heater was introduced under agitation 75.0 g of amine terminated polyoxytetramethylenediamine, Jeffamine® ED-2001 (XTJ-576), each amine being secondary, with amine value of 0.91 meq/g, then heated at 100IC under vacuum to dryness, cooled to 31° C. and vacuum released with nitrogen. Agitation was increased to 500 rpm and 6.5 g of isophorone diisocyanate (NCO/NH=0.845) was added. An exotherm from 31 to 39° C. was observed after which the reactor was heated to 50-60° C. for 1 hour. Wt % NH determined per standard methodology was found to be 0.047 wt %. At this point, 0.5 g of 3-isocyanato-propyltrimethoxysilane was added and agitation continued providing silylated polyurea. After the addition of 0.1 g methanol and 1.6 g vinyltrimethoxysilane, cooling was applied. Titration for NCO and NH were below detection limits. Viscosity was 40,500 cps. The wt % as Si (28) was 0.09 wt %. The resin mixture was formulated into a sealant composition employing a Hauschild SpeedMixer DAC 600FVZ and thereafter formed into 0.125 inch×5 inch×5 inch sheet specimens which were allowed to cure for two weeks at room temperature at a relative humidity of 35%. Physical properties of the cured sealant composition were measured in triplicate, the average measurements being reported in Table 1 below. The sealant properties included a low modulus and Shore A hardness with higher than anticipated tear resistance, a property which is especially useful, inter alia, for LIM (Liquid Injection Molding) operations as, for example, the manufacture of medical pads.

TABLE 1

| Component | Grams |
|---|---|
| Resin | 40 |
| DIDP | 17.9 |
| Silquest A-171 | 1.45 |
| Ultra-pflex | 57.1 |
| Hi-pflex | 23.0 |
| Silquest A-1120 | 1.45 |
| DBTDL | 0.09 |
| Properties of the Cured Sealant | |
| Tensile (psi) | 93 |
| 100% Modulus (psi) | 65 |
| Elongation (%) | 196 |
| Tear Resistance (lb/in) | 23 |
| Shore A Hardness | 14.5 |

EXAMPLE 16

This example illustrates the silylation of a secondary amine-terminated polyurea prepolymer (100 equivalent % urea linkages) with an isocyanatosilane to provide a silylated polyurea of the invention and the incorporation of the silylated polyurea in a sealant composition.

To a reactor provided with stirrer and heater were introduced under agitation 75.0 g of amine terminated polyoxytetramethylenediamine, Jeffamine® ED-2001 (XTJ-576), each amine being secondary, with amine value of 0.91 meq/g, 22.7 g butyl acetate and 32.6 g ethyl acetate. Agitation was increased to 200 rpm and a solution of 6.5 g of isophorone diisocyanate, 2.35 g polyisocyanate Desmodur® Z-4470BA and 28.5 g toluene (NCO/NH=0.945) was added. An exotherm from 26 to 30° C. was observed after which the vessel was heated to 45° C. for 1 hour. Wt % NH determined per standard methodology was found to be 0.03 wt %. At this point, 0.7 g of 3-isocyanatopropyltrimethoxysilane was added and agitation continued to provide silylated polyurea. Titration for NCO and NH were below detection limits. Viscosity was 368 cps and solids 52.6%. The wt % as Si (28) was 0.11 wt %.

A 19.0 g sample of the silylated polyurea was blended with a 30 g sample of the known type of silylated polyurethane prepared in Comparative Example 1, infra, followed by devolatilization of the resin mixture. The devolatized resin mixture was formulated as a sealant composition employing a Hauschild SpeedMixer DAC 600FVZ and thereafter formed into 0.125 inch×5 inch×5 inch sheet specimens which were allowed to cure for two weeks at room temperature at a relative humidity of 35%. Physical properties of the cured sealant specimens were measured in triplicate, the average measurements being reported in Table 2 below. The tensile, modulus and tear properties indicate a high crosslink density. However, the Shore hardness is lower than would be expected when comparison is made with the aforesaid silylated polyurethane resin. This result indicates particular suitability of the silylated polyurea of the invention for applications requiring a softer sealant with higher tensile, modulus and tear strength.

TABLE 2

| Component | Grams |
|---|---|
| Resin | 40 |
| DIDP | 20.8 |
| Silquest A-171 | 0.5 |
| Ultra-pflex | 49.9 |
| Hi-pflex | 26.9 |
| Silica | 0.3 |
| Titania | 1.6 |
| Silquest A-1120 | 0.8 |
| DBTDL | 0.04 |
| Properties of the Cured Sealant | |
| Tensile (psi) | 229 |
| 100% Modulus (psi) | 175 |
| Elongation (%) | 175 |
| Tear Resistance (lb/in) | 47 |
| Shore A Hardness | 43 |

EXAMPLE 17

This example illustrates the silylation of an amine-terminated polyurea prepolymer obtained from a mixture of secondary diamine and primary triamine (100 equivalent % urea linkages) with an isocyanatosilane to provide a silylated polyurea of the invention and its incorporation in a sealant composition.

To a reactor provided stirrer and heater were introduced under agitation 75.0 g of amine-terminated polyoxytetramethylenediamine, Jeffamine® ED-2001 (XTJ-576), each amine being secondary, with amine value of 0.91 meq/g, 9.8 g of amine-terminated polyoxytetramethylenetriamine, Jeffamine® T-3000 (XTJ-509), each amine being primary, with amine value of 0.97 meq/g, 23.2 g butyl acetate and 43.4 g ethyl acetate. Agitation was increased to 200 rpm and 8.1 g of isophorone diisocyanate in 26.2 g toluene (NCO/NH=0.93) was added dropwise. An exotherm from 26 to 30° C. was observed after which the reactor was heated to 45° C. for 1 hour. Wt % NH determined per standard methodology was found to be 0.023 wt %. At this point, 0.6 g of 3-isocyanatopropyltrimethoxysilane was added and agitation continued to provide silylated polyurea. Titration for NCO and NH were below detection limits. Solids was 51.9% and viscosity 1070 cps. Viscosity at 100% solids measured 117,000 cps using a Brookfield DV-II+ Pro. The wt % as Si (28) was 0.08 wt %.

A 19.3 g sample of the silylated polyurea was blended with a 30 g sample of silylated polyurethane resin of Comparative Example 1, infra, after which the mixture was devolatized. The devolatized resin mixture was formulated into a sealant composition as in Example 16 using a Hauschild SpeedMixer DAC 60OFVZ, formed into 0.125 inch×5 inch×5 inch sheet samples and allowed to cure for two weeks at room temperature at a relative humidity of 35%. Physical properties of the cured sealant were measured in triplicate, the average measurements being reported in Table 3 below. These results demonstrate that a silylated polyurea derived from a mixture of triamine and diamine provides a cured silylated polyurea resin of increased tear resistance without altering tensile, modulus, elongation or Shore A hardness compared to the cured resin of Example 16.

TABLE 3

| Properties of the Cured Sealant | |
|---|---|
| Tensile (psi) | 227 |
| 100% Modulus (psi) | 173 |
| Elongation (%) | 171 |
| Tear Resistance (lb/in) | 69 |
| Shore A Hardness | 43 |

COMPARATIVE EXAMPLE 1

This example illustrates the preparation of a known type of moisture-curable silylated polyurethane resin ("SPUR" resin; 100 equivalent percent of urethane linkages) and sealant composition containing same and is presented for purposes of comparison with the silylated polyurea and sealant composition of the invention as illustrated in Example 16, supra.

To a reactor provided with stirrer and heater was introduced under agitation 200.0 g of polypropylene oxide diol, Acclaim® 8200, with hydroxyl number (OH#) of 14. Agitation was increased to 200 rpm, the diol was dried under vacuum at 100° C., thereafter cooled to 65° C. and the vacuum released using nitrogen. To the diol was added 0.006 g dibutyltin dilaurate and 2.8 g of isophorone diisocyanate (NCO/OH=0.5). Heating was continued until wt % NCO determined per standard methodology was less than 0.02 wt %. At this point, 5.1 g of 3-isocyanatopropyltrimethoxysilane was added and agitation continued until wt % NCO titration was below 0.01 wt %. Viscosity of the resulting SPUR resin was 55,000 cps. and the wt % as Si (28) was 0.33 wt %. The SPUR resin was formulated into a sealant composition employing a Hauschild SpeedMixer DAC 600FVZ and thereafter formed into 0.125"×5"×5" sheet specimens which were allowed to cure for two weeks at room temperature at a relative humidity of 35%. Physical properties of the cured sealant composition were measured in triplicate, the average measurements being reported in Table 4 below.

TABLE 4

| Component | Grams |
| --- | --- |
| Resin | 40 |
| DIDP | 20.8 |
| Silquest A-171 | 0.5 |
| Ultra-pflex | 49.9 |
| Hi-pflex | 26.9 |
| Silica | 0.3 |
| Titania | 1.6 |
| Silquest A-1120 | 0.8 |
| DBTDL | 0.04 |
| Properties of the Cured Sealant | |
| Tensile (psi) | 189 |
| 100% Modulus (psi) | 125 |
| Elongation (%) | 257 |
| Tear Resistance (lb/in) | 39 |
| Shore A Hardness | 59 |

COMPARATIVE EXAMPLE 2

Comparative Example 2 illustrates the preparation of a silylated polyurethane-polyurea resin as disclosed in U.S. published patent application 2007/0129527A1 (58 equivalent % urea linkages, 42 equivalent % urethane linkages), and outside the scope of this invention, and a sealant composition containing same.

To a reactor provided with stirrer and heater were introduced under agitation 168.8 g of polypropylene oxide diol, Acclaim® 12200 with hydroxyl number (OH#) of 10, and 76.5 g of amine-terminated polyoxytetramethylenediamine, Jeffamine® ED-2001 (XTJ-576), each amine being secondary, with amine value of 0.91 meq/g. Agitation was increased to 200 rpm, the diol dried under vacuum at 100° C., thereafter cooled to 60° C. and the vacuum released using nitrogen. Agitation was increased to 700 rpm followed by the addition of 8.6 g of isophorone diisocyanate (NCO/NH+OH=0.84). To this mixture was added 0.2 g of a 1 wt % toluene solution of dimethylbis[(1-oxoneodecyl)oxy]stannane and heating was continued until NCO determined per standard methodology was no longer detected. At this point, 3.0 g of 3-isocyanato-propyltrimethoxysilane was added and agitation continued until titration indicated the absence of detectable NCO. Viscosity of the resulting silylated polyurethane-polyurea product was 263,000 cps. and the wt % as Si (28) was 0.17 wt %.

The silylated polyurethane-polyurea was formulated into a sealant composition employing a Hauschild SpeedMixer DAC 600FVZ and thereafter formed into 0.125 inch×5 inch×5 inch sheet specimens which were allowed to cure for two weeks at room temperature maintained at a relative humidity of 35%. Physical properties of the cured sealant composition were measured in triplicate, the average measurements being reported in Table 5 below. The cured sealant was a very soft, low modulus material with high elongation and tear resistance.

TABLE 5

| Component | Grams |
| --- | --- |
| Resin | 40 |
| DIDP | 20.8 |
| Silquest A-171 | 0.5 |

TABLE 5-continued

| Component | Grams |
| --- | --- |
| Ultra-pflex | 49.9 |
| Hi-pflex | 26.9 |
| Silica | 0.3 |
| Titania | 1.6 |
| Silquest A-1120 | 0.8 |
| DBTDL | 0.04 |
| Properties of the Cured Sealant | |
| Tensile (psi) | 119 |
| 100% Modulus (psi) | 67 |
| Elongation (%) | 349 |
| Tear Resistance (lb/in) | 37 |
| Shore A Hardness | 19 |

* * *

The silylated polyurea(s) of the invention overcome a major disadvantage of known and conventional two-part polyurea compositions, specifically, the use of polyisocyanates, which pose environmental and health concerns when handled. The silylated polyurea herein also offer lower cost and simpler processing compared to known and conventional polyurethanes and polyurethane-ureas due to the higher reactivity of organoamines with polyisocyanates compared to organohydroxyl groups with polyisocyanates. In addition, the silylated polyureas of the invention can provide unique adhesive properties in contact with skin, exhibit excellent solvent resistance, sealant properties enhancement and higher shear adhesion failure temperatures.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof Therefore, it is intended that the invention not be limited to any particular exemplary embodiment disclosed herein.

The invention claimed is:

1. A pressure sensitive moisture-curable adhesive composition comprising a silylated polyurea or mixture thereof which comprises the reaction product of at least one organofunctional silane (a) possessing hydrolyzable functionality and at least one amine-terminated polyurea prepolymer (b), organofunctional silane (a) being an amine-reactive silane (a)(1) and, polyurea (b) being obtained from the reaction of at least one polyamine (c) and at least one polyisocyanate (d) in the substantial absence of organofunctional silane (a), the polyurea prepolymer possessing an average of from 80 to 100 equivalent percent of urea groups based on the total equivalents of urea and urethane groups therein, and wherein the silylated polyurea possesses a number average molecular weight of from 3,000 to 100,000 and a viscosity of from 5,000 to 5,000,000 cps and wherein the adhesive possesses a probe tack for 100 g/cm² applied force of from 393 g/cm² to 635 g/cm², wherein polyurea prepolymer (b) is reacted with organofunctional silanes of the general formula:

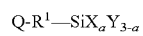

$$Q-R^1-SiX_aY_{3-a}$$

wherein Q is an amine-reactive functionality, $R^1$ is a divalent bridging group having from 2 to 12 carbon atoms, each X is independently hydrogen or hydrocarbyl of up to 12 carbon atoms, each Y is the same or different hydrolyzable group and a is 0, 1 or 2;

wherein amine-reactive silane (a)(1) is at least one isocyanatosilane (a)(1)(i) selected from the group consisting of methyldimethoxysilylethyl isocyanate, trimethoxysilylethyl isocyanate, ethyldimethoxysilylethyl isocyanate, methyldiethoxysilylethyl isocyanate, trimethoxysilylethyl isocyanate, ethyldiethoxysilylethyl isocyanate, methyldimethoxysilylpropyl isocyanate, trimethoxysilylpropyl isocyanate, ethyldimethoxysilylpropyl isocyanate, methyldiethoxysilylpropyl isocyanate, triethoxysilylpropyl isocyanate, ethyldiethoxysilylpropyl isocyanate, methyldimethoxysilylpropyl isocyanate, methyldimethoxysilylbutyl isocyanate, trimethoxysilylbutyl isocyanate, ethyldimethoxysilylbutyl isocyanate, methyldiethoxysilylbutyl isocyanate, trimethoxysilylbutyl isocyanate, ethyldiethoxysilylbutyl isocyanate, methyldimethoxysilylpentyl isocyanate, trimethoxysilylpentyl isocyanate, ethyldimethoxysilylpentyl isocyanate, methyldiethoxysilylpentyl isocyanate, triethoxysilylpentyl isocyanate, ethyldiethoxysilylpentyl isocyanate, methyldimethoxysilylpentyl isocyanate, methyldimethoxysilylhexyl isocyanate, trimethoxysilylhexyl isocyanate, ethyldimethoxysilylhexyl isocyanate, methyldiethoxysilylhexyl isocyanate, triethoxysilylhexyl isocyanate, ethyldiethoxysilylhexyl isocyanate, methyldimethoxysilylhexyl isocyanate and λ-trimethoxysiloxydimethylsilylpropyl isocyanate, and/or at least one epoxysilane (a)(1)(ii) selected from the group of 3-glycidoxypropyltrimethoxysilane, 3-glycidoxypropylmethyldiethoxysilane, β-(3,4-epoxycyclohexyl)ethyltrimethoxysilane, β-(3,4-epoxycyclohexyl)ethyltriethoxysilane and/or, at least one (meth)acryloxysilanes (a)(1)(iii) selected from the group of 3-acryloxypropyltrimethoxysilane, 3-acryloxypropyltriethoxysilane, 3-acryloxypropyltriisopropoxysilane, 3-methacryloxypropyltrimethoxysilane, 3-methacryloxyisobutyltrimethoxysilane, 3-acryloxypropyltrichlorosilane, 3-methacryloxyisobutyltrichlorosilane, 3-methacryloxyisobutyltrichorosilane and 3-methacryloxypropyl[tris(beta-methoxyethoxy)]silane; and, wherein polyurea (b) is amine-terminated polyurea (b)(1) or mixture thereof in which at least a portion up to substantially all of the amine groups present therein are secondary amine groups.

2. The moisture-curable adhesive of claim 1 wherein the silylated polyurea possesses at least 90 equivalent percent of urea groups based on the total equivalence of urea and urethane groups.

3. The moisture-curable adhesive of claim 1 wherein polyurea prepolymer (b) contains from 0.03 to 1.23 weight percent unreacted amine groups (c) and/or less than 10 weight percent oligomer, and the weight percent of silicon in the silylated polyurea ranges from 0.08 to 0.29 based on the total solids content of the silylated polyurea.

4. The moisture-curable adhesive of claim 1 wherein polyurea prepolymer (b) has 95 to 100 equivalent percent urea groups based on total equivalence of urea and urethane groups.

5. The moisture-curable adhesive of claim 1 wherein polyurea prepolymer (b) is derived from polyamine (c) possessing an average of from 2 to 3 amine groups and from polyisocyanate (d) possessing an average of from 2 to 3 isocyanate groups.

6. The moisture-curable adhesive of claim 1 wherein wherein Q is an isocyanate functionality.

7. The moisture-curable adhesive of claim 1 wherein Q is isocyanate, epoxy or (meth)acryloxy functionality.

8. The moisture-curable adhesive of claim 1 wherein $R^1$ is alkylene of from 2 to 4 carbon atoms, each X is independently alkyl of from 1 to 4 carbon atoms and each Y is independently alkoxy of from 1 to 4 carbon atoms.

9. The moisture-curable adhesive of claim 1 wherein polyurea (b) is obtained from the reaction of: (1) monomeric polyamine(s)(c) and monomeric polyisocyanate(s)(d), or (2) monomeric polyamine(s)(c) and perfect prepolymer(s), oligomeric polyisocyanate(s) and/or polymeric polyisocyanate(s)(d), or (3) oligomeric and/or polymeric polyamine(s)(c) and monomeric polyisocyanate(s)(d), or (4) oligomeric and/or polymeric polyamine(s)(c) and perfect prepolymer(s), oligomeric polyisocyanate(s) and/or polymeric polyisocyanate(s)(d).

10. The moisture-curable adhesive of claim 1 wherein the backbone of an oligomeric and/or polymeric diamine (c) is entirely or predominantly one of polyether, polyester, polycarbonate, polyamide, polyurea, polybutadiene, butadiene-acrylonitrile copolymer or elastomer.

11. The moisture-curable adhesive of claim 1 wherein some of the amine terminated groups in polyurea (b) or mixture thereof are capped with an amine reactive monofunctional capping reactant.

12. The moisture-curable adhesive of claim 1 wherein the silylated polyurea possesses branching.

13. The moisture-curable adhesive of claim 1 wherein the silylated polyurea possesses a number average molecular weight of from 4,000 to 75,000 and a viscosity of from 10,000 to 3,000,000 cps.

14. The moisture curable adhesive of claim 1 wherein the silylated polyurea possesses a number average molecular weight of from 5,000 to 50,000 and a viscosity of from 20,000 to 3,000,000 cps.

15. A moisture-curable adhesive composition comprising a silylated polyurea reaction product of at least one organofunctional silane (a) possessing hydrolyzable functionality and at least one amine-terminated or isocyanate-terminated polyurea (b) such that when polyurea (b) is amine-terminated polyurea (b)(1), organofunctional silane (a) is amine-reactive silane (a)(1) and when polyurea (b) is isocyanate-terminated polyurea (b)(2), organofunctional silane (a) is isocyanate-reactive silane (a)(2), polyurea (b) being obtained from the reaction of at least one polyamine (c) and at least one polyisocyanate (d) in the substantial absence of organofunctional silane(a), the moisture-curable silylated polyurea possessing an average of from 80 to 100 equivalent percent of urea groups based on the total equivalents of urea and urethane groups therein, a number average molecular weight of from 3,000 to 100,000 and a viscosity of from 5,000 to 5,000,000 cps., and wherein amine-reactive silane (a)(1) is at least one isocyanatosilane (a)(1)(i) selected from the group consisting of methyldimethoxysilylethyl isocyanate, trimethoxysilylethyl isocyanate, ethyldimethoxysilylethyl isocyanate, methyldiethoxysilylethyl isocyanate, trimethoxysilylethyl isocyanate, ethyldiethoxysilylethyl isocyanate, methyldimethoxysilylpropyl isocyanate, trimethoxysilylpropyl isocyanate, ethyldimethoxysilylpropyl isocyanate, methyldiethoxysilylpropyl isocyanate, triethoxysilylpropyl isocyanate, ethyldiethoxysilylpropyl isocyanate, methyldimethoxysilylpropyl isocyanate, methyldimethoxysilylbutyl isocyanate, trimethoxysilylbutyl isocyanate, ethyldimethoxysilylbutyl isocyanate, methyldiethoxysilylbutyl isocyanate, trimethoxysilylbutyl isocyanate, ethyldiethoxysilylbutyl isocyanate, methyldimethoxysilylpentyl isocyanate, trimethoxysilylpentyl isocyanate, ethyldimethoxysilylpentyl isocyanate, methyldiethoxysilylpentyl isocyanate, triethoxysilylpentyl isocyanate, ethyldiethoxysilylpentyl isocyanate, methyldimethoxysilylpentyl isocyanate, methyldimethoxysilylhexyl isocyanate, trimethoxysilylhexyl isocyanate, ethyldimethoxysilylhexyl isocyanate, methyldiethoxysilylhexyl isocyanate, triethoxysilylhexyl isocyanate, ethyldiethoxysilylhexyl isocyanate, methyldimethoxysilylhexyl isocyanate and λ-trimethoxysiloxydimethylsilylpropyl isocyanate, and/or at least one epoxysilane (a)(1)(ii) selected from the group of 3-glycidoxypropyltrimethoxysilane, 3-glycidoxypropylmethyldiethoxysilane, β-(3,4-epoxycyclohexyl)ethyltrimethoxysilane, β-(3,4-epoxycyclohexyl)-ethyltriethoxysilane and/or at least one (meth)acryloxysilanes (a)(1)(iii) is selected from the group of 3-acryloxypropyltrimethoxysilane, 3-acryloxypropyltriethoxysilane, 3-acryloxypropyltriisopropoxysilane, 3-methacryloxypropyltrimethoxysilane, 3-methacryloxyisobutyltrimethoxysilane, 3-acryloxypropyltrichlorosilane, 3-methacryloxyisobutyltrichlorosilane, 3-methacryloxyisobutyltrichorosilane and 3-methacryloxypropyl[tris(beta-methoxyethoxy)] silane; and, wherein polyurea (b) is amine-terminated polyurea (b)(1) or mixture thereof in which at least a portion up to substantially all of the amine groups present therein are secondary amine groups.

16. A skin-adherent label coated with the pressure sensitive moisture-curable adhesive composition of claim 1.

17. A skin-adherent label coated with the pressure sensitive moisture-curable adhesive composition of claim 15.

* * * * *